United States Patent
Wang et al.

(10) Patent No.: US 6,592,805 B1
(45) Date of Patent: Jul. 15, 2003

(54) METHOD FOR PRODUCING SINTERED ELECTROCERAMIC MATERIALS FROM HYDROXIDE AND OXALATE PRECURSORS

(75) Inventors: John Wang, Singapore (SG); Junmin Xue, Singapore (SG); Leong Ming Gan, Singapore (SG); Ser Choon Ng, Singapore (SG); Leong Chew Lim, Singapore (SG)

(73) Assignee: National University of Singapore, Singapore (SG)

( * ) Notice: Subject to any disclaimer, the term of this patent is extended or adjusted under 35 U.S.C. 154(b) by 0 days.

(21) Appl. No.: 09/719,337

(22) PCT Filed: Jun. 4, 1999

(86) PCT No.: PCT/SG99/00056
§ 371 (c)(1),
(2), (4) Date: Jun. 21, 2001

(87) PCT Pub. No.: WO99/64366
PCT Pub. Date: Dec. 16, 1999

(30) Foreign Application Priority Data

Jun. 11, 1998 (SG) .............................................. 9801396

(51) Int. Cl.$^7$ ...................... C04B 35/468; C04B 35/462

(52) U.S. Cl. ...................... 264/614; 264/653; 264/658; 264/661; 264/667

(58) Field of Search .................. 264/614, 667, 264/658, 661, 653

(56) References Cited

U.S. PATENT DOCUMENTS

| 4,283,228 A | 8/1981 | Buchanan et al. .......... 106/73.3 |
| 5,368,834 A | 11/1994 | Kulwicki et al. ............ 423/598 |
| 5,433,917 A | 7/1995 | Srivastava et al. ............. 419/22 |
| 5,573,582 A | 11/1996 | Inui et al. ............... 106/287.17 |
| 6,093,338 A | * 7/2000 | Tani et al. ................... 264/667 |

FOREIGN PATENT DOCUMENTS

EP        0280033        8/1988

* cited by examiner

Primary Examiner—James Derrington
(74) Attorney, Agent, or Firm—David Jaffer; Pillsbury Winthrop LLP

(57) ABSTRACT

A method for producing electroceramic materials of high sintered density from hydroxide and/or oxalate precursors is disclosed. In this method the precursor(s) are compacted to form a preform, thermally treated, recompacted and then sintered to form finished products.

9 Claims, 3 Drawing Sheets

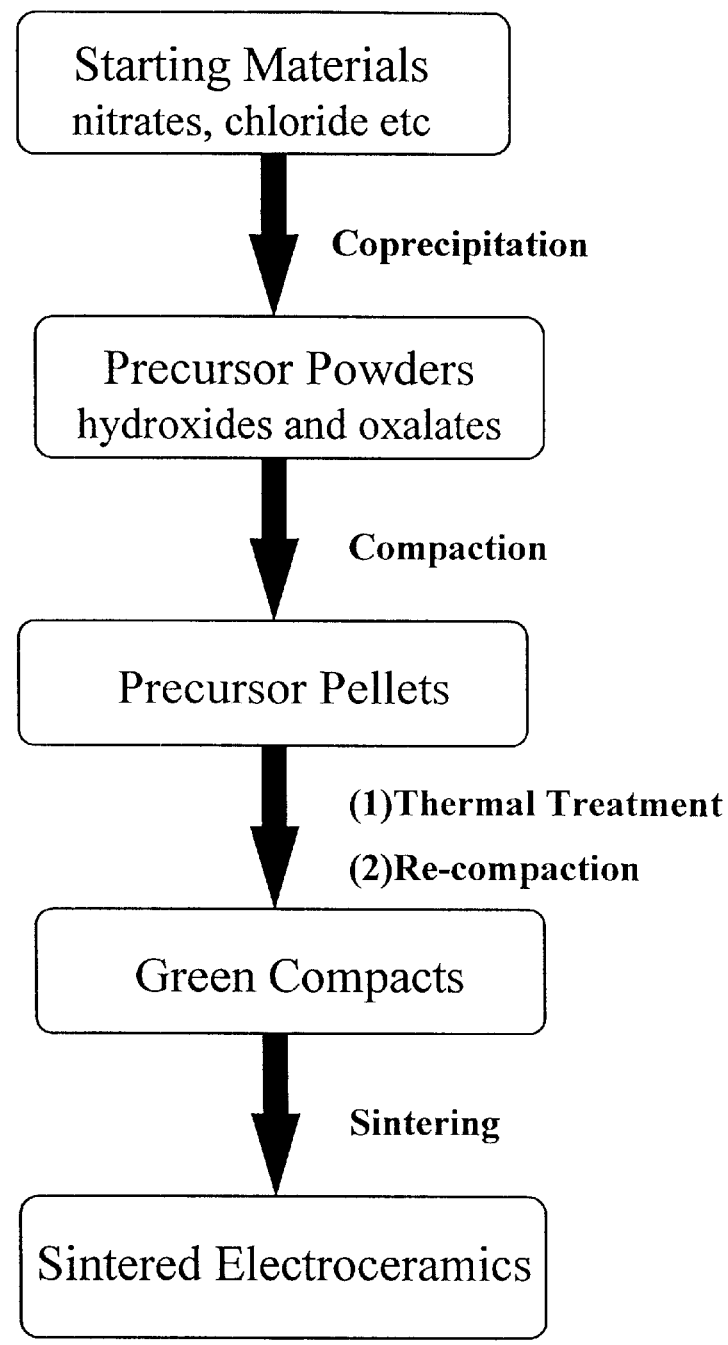
Figure 1 Flow diagram showing the various steps involved in the direct processing technique

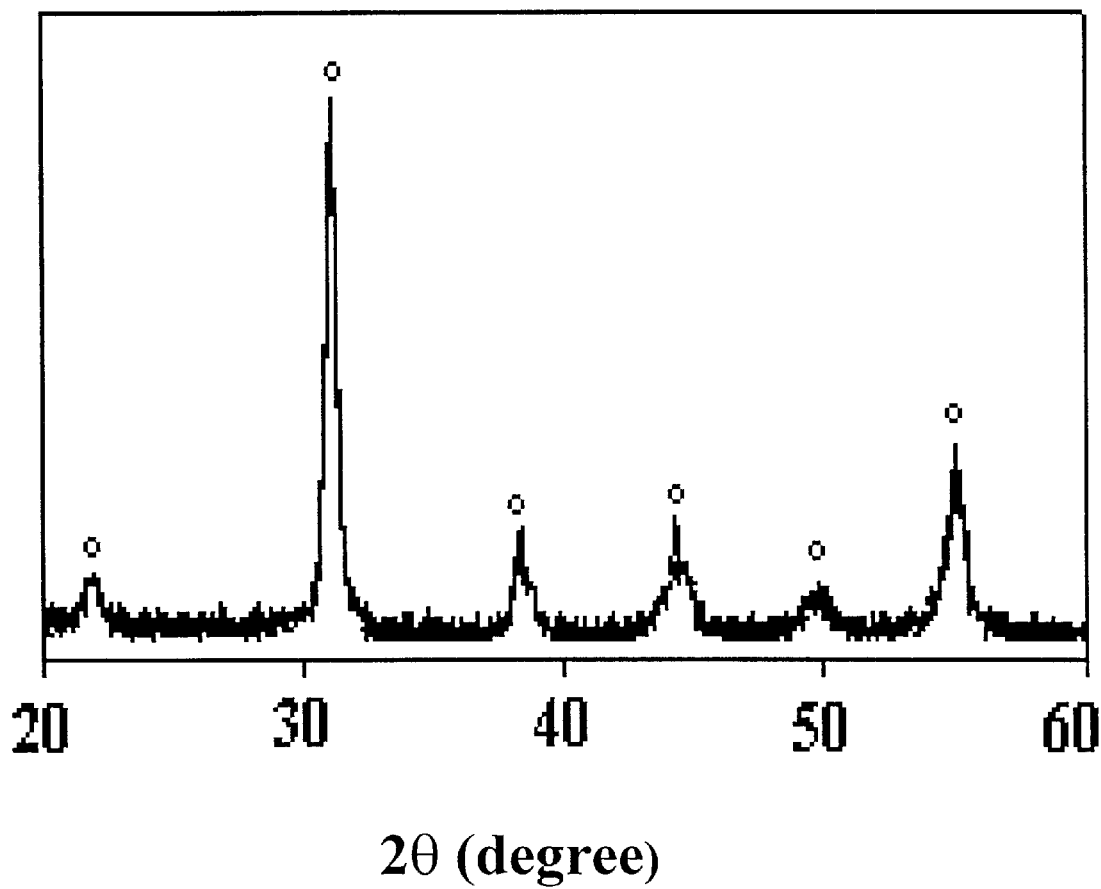
Figure 2 XRD pattern of $Pb(Zr_{0.52}Ti_{0.48})O_3$ sintered at 1050°C for 1 hour

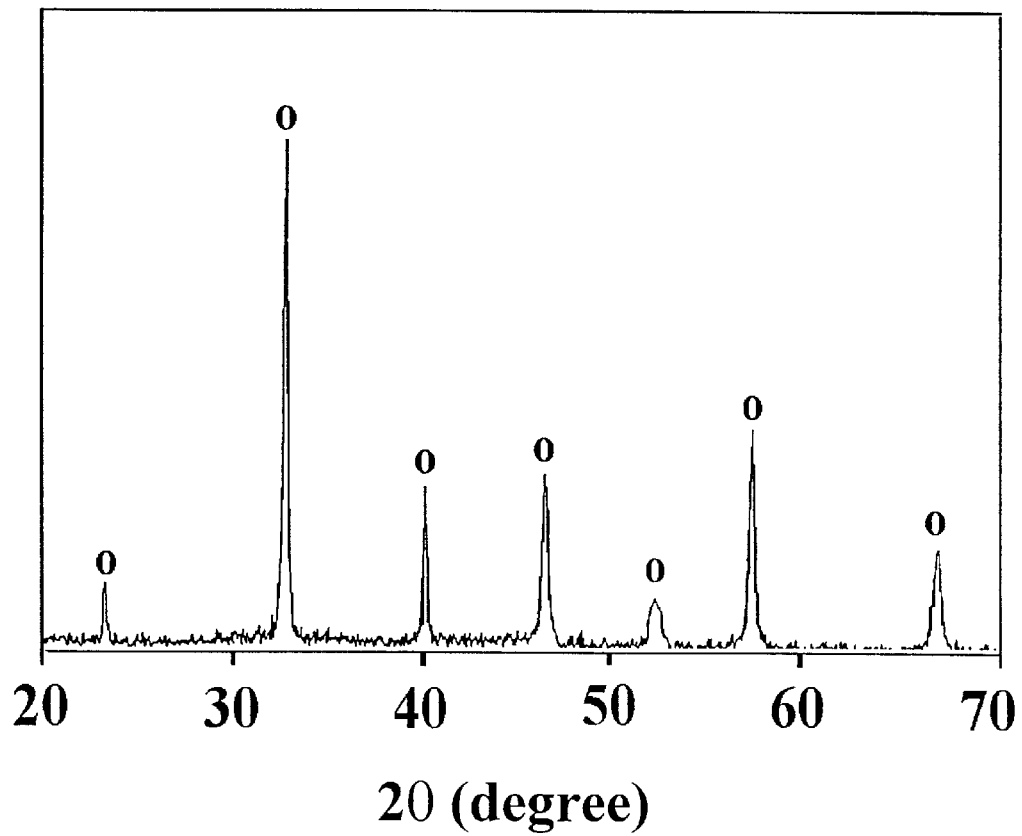
Figure 3 XRD pattern of $Br_{0.65}Sr_{0.35}TiO_3$ sintered at 1200°C for 1 hour

METHOD FOR PRODUCING SINTERED ELECTROCERAMIC MATERIALS FROM HYDROXIDE AND OXALATE PRECURSORS International application PCT/SG99/00056 was published under PCT Article 21(2) in English. This application is the national phase of international application PCT/SG99/00056 filed Jun. 4, 1999which designated the U.S.

FIELD OF THE INVENTION

The present invention relates to the fabrication of electroceramic materials, such as lead zirconate titanate and barium strontium titanate, of high sintered density at a lowered sintering temperature. More particularly, the invention advantageously provides a method for the production of electroceramics of high density from coprecipitated hydroxides and oxalates without the use of any sintering aids/additives. The direct processing technique also advantageously offers a unique advantage in minimizing the level of contamination in the sintered electroceramics, due to the elimination of certain intermediate processing steps, such as the calcination and subsequent ball milling of precursor powders.

BACKGROUND OF THE INVENTION

Electroceramics, such as lead zirconate titanate (PZT), lead lanthanum zirconate titanate (PLZT) and barium strontium titanate (BST), are technologically important materials in electronics and microelectronics due to their unique piezoelectric, ferroelectric and many other electromechanical, pyroelectric and optoelectrical properties. On the one hand, high sintered density and uniform microstructure are among the most desirable features for almost all the electroceramics in achieving many of these desirable electrical properties. It is however difficult to achieve a sintered density close to the theoretical density for most of the electroceramic materials via conventional ceramic processing routes using mixed oxides as the starting materials. This, together with many of the undesirable features of sintered electroceramics, such as non-stoichiometry and wide fluctuations in composition and microstructure, are to a large extent due to inadequate processing routes chosen for fabricating these materials. For example, as a result of the high volatility of PbO at elevated temperatures, there is a significant loss of lead oxide in the production of lead-containing electroceramics such as PZT, PLZT and lead magnesium niobate (PMN) at high sintering temperatures of >1200° C., leading to the formation of one or more pyrochlore phases and therefore a reduction in sintered density. On the other hand, the use of electroceramic materials in co-firable mulitlayer electronic and microelectronic devices for many electromechanical applications requires that the electroceramic compositions be sinterable at temperatures below 1000° C., as a lowered firing temperature will apparently alleviate, if not completely eliminate, the detrimental interactions between the ceramic layer and the electrode layer seen at a higher sintering temperature. It is envisaged that a reduction in the sintering temperature of electroceramic materials will eventually lead to the substitution of very expensive electrodes, such as platinum and palladium, by much cheaper ones such as silver, nickel, copper and their alloys. Therefore, there is considered to be substantial technological and economic significance in methods of lowering the sintering temperature of electroceramics without sacrificing the electrical properties thereof too greatly.

Two general approaches have been taken in order to lower the sintering temperature of electroceramics, preferably to the range of <1000° C. for PZT as an example. These include (i) employing an ultrafine starting powder prepared mainly via various chemistry-based processing routes; and (ii) using a sintering aid/additive of low melting point, such as $V_2O_5$, $Bi_2O_3$, and an eutectic mixture of CuO and barium or strontium oxide, as claimed by Buchanan and Wittmer in U.S. Pat. No. 4,283,228 (1981) and Srivastava, Bhalla and Cross in U.S. Pat. No. 5,433,917 (1995), respectively. Unfortunately, many of the chemistry-based powder preparation routes for electroceramics are associated with disadvantages such as very high manufacture cost and low production yield, which make them unsuitable for industrial scale production of electroceramic components. Furthermore, most of these have yet to demonstrate any significant advantages in lowering the sintering temperature of electroceramic materials over the conventional electroceramic processing routes. The approach of employing sintering aids/additives is attractive in terms of being able to lower the sintering temperature of electroceramics by forming a liquid phase at the grain boundaries and grain junctions, as has been demonstrated for PZT to below 1000° C. However, the sintering aids/additives are often detrimental to the electrical properties of the electroceramics, due to the formation of a secondary non-electroceramic phase concentrated at the grain boundaries and grain junction of sintered electroceramics. In addition to this, the majority of the sintering aids/additives suggested are extremely toxic and therefore are very difficult to handle in any large scale production of electroceramic components.

Using high-purity inorganic or organic salts as the starting materials, precursor-calcination-milling-pelleting-sintering is the well established fabrication route for many electroceramics. The precursor is normally prepared via a wet-chemistry route, such as sol-gel, hydrolysis, hydrothermal reaction or coprecipitation, followed by calcination and ball milling steps in order to form the required electroceramic phase and to adjust the powder characteristics. The calcination of precursor powders at an intermediate temperature unfortunately removes almost all the advantages offered by most of the chemistry-based powder preparation techniques, including very high specific surface area, ultrafine particle size and narrow particle size distribution. This is a result of particle agglomeration in the calcined electroceramic powders. The presence of hard particle agglomerates adversely affects subsequent compaction and sintering behaviour of ceramic powders and results in a reduced density and the occurrence of microstructural defects in sintered electroceramics, as observed by F. F. Lange, see J. Amer. Ceram. Soc., 66, pp.396–398 (1983) and W. H. Rhodes, See J. Amer. Ceram. Soc., 64, pp. 19–22 (1981). A post-calcination milling process is generally required in order to modify the powder characteristics, e.g., the particle/agglomerate size and particle morphology, before the powder is shaped to a powder compact or a component shape and then densified at high sintering temperatures. However, some hard particle agglomerates (aggregates) can not be effectively eliminated by conventional milling such as ball milling. Furthermore, a mechanical milling inevitably introduces contamination into the electroceramic materials. Contamination in the range of 0.1 to 2 wt % is common under normal milling conditions as pointed out by Moulson and Herbert (Electroceramics, Chapman and Hall, London, 1990). Such high levels of contamination are unacceptable for many electroceramic materials.

Reaction sintering, in which the reaction between constituent component phases occurs concurrently with the densification process at the sintering temperature, has been established as a viable fabrication technique for a wide range of oxide and non-oxide ceramics. It offers at least two advantages over the conventional ceramic processing routes: (i) no intermediate milling and drying of pre-reacted and post-reacted compounds are required; and (ii) the free energy associated with the reaction helps facilitate densification. For example, T. R. Shrout, P. Papet, S. Kim, and G. Lee, see J. Amer. Ceram. Soc., 73, pp.1862–1867 (1990), and S. Kim, G. Lee, T. R. Shrout and S.Venktanari, see J. Mater. Soc., 26, pp.4411–4415 (1991), observed that the densification of PZT was enhanced by the reaction of constituent oxides in a partially reacted system. Since the precursors exhibit a higher degree of mixing homogeneity, the reaction may be completed at a lower temperature than those for mixed oxides.

SUMMARY OF THE INVENTION

The present invention relates to the fabrication of electroceramic materials of high sintered density at sintering temperatures of substantially lower than those normally required by the traditional precursor-calcination-milling-pelleting-sintering route, without use of any sintering aids/additives.

Accordingly, the present invention provides a method for producing an electroceramic material from hydroxide and/or oxalate precursors, said method comprising:

compacting a mixture containing at least one hydroxide and/or oxalate precursor to form a preform;

thermally treating the preform at a predetermined temperature;

re-compacting the preform; and sintering the re-compacted preform to form said electroceramic material.

The invention also provides an electroceramic material produced by the method of the immediately preceding paragraph.

In a preferred embodiment, the invention involves the use of fine and reactive hydroxide and oxalate precursors, preferably prepared via coprecipitation from aqueous solutions containing desirable cations. The precursors are not calcined at an intermediate temperature in order to avoid the adverse effects of particle agglomeration on densification of electroceramics at the sintering temperature. Instead, they are directly shaped into pellets or any other complex shapes by compaction. The pellets or preforms of hydroxide or oxalate precursors are then thermally treated in a controlled manner preferably at a temperature in the range of 400° C. to 700° C., followed by a re-compaction, preferably by isostatic pressing to further increase their green densities. Sintering of the isostatically pressed compacts is carried out at a temperature which may advantageously be ~200° C. lower than that required in traditional precursor-calcination-milling-pelleting-sintering routes Compared with conventional precursor-calcination-milling-pelleting-sintering route, the intermediate calcination and milling steps of precursor powders are advantageously eliminated and a lower sintering temperature may advantageously be used in the present method. Using the present method, hydroxide-derived lead zirconate titanate (PZT) may be sintered to a relative density of >98% theoretical at temperatures below 1000° C. without the use of any sintering aids/additives. Similarly the oxalate-derived barium strontium titanate (BST) may be sintered to a density of >99% theoretical density at a temperature of 1200° C. for 1 hour. These sintering temperatures are, as discussed above substantially lower than those required by conventional precursor-calcination-milling-pelleting-sintering routes.

DESCRIPTION OF THE DRAWINGS

Preferred embodiments of the present invention will now be described in more detail with reference to the accompanying drawings, in which:

FIG. 1 is a flow diagram summarizing the various steps involved in the direct processing technique of electroceramics from hydroxide and oxalate precursors. Intermediate steps, such as the calcination of precursor powders and subsequent milling of the calcined electroceramic phases, are omitted, leading to a lowering in the sintering temperatures of, for example, PZT and BST.

FIG. 2 is an XRD pattern of a $Pb(Zr_{0.52}Ti_{0.48})O_3$ sintered at 1050° C. for 1.0 hour prepared according to the invention.

FIG. 3 is an XRD pattern of a $Br_{0.65}Sr_{0.35}TiO_3$ sintered at 1200° C. for 1.0 hour prepared according to the invention.

DETAILED DESCRIPTION OF PREFERRED EMBODIMENTS

A direct processing method for producing electroceramic materials, such as PZT and BST of various compositions and PLZT, from hydroxide and oxalate precursors is iprovided which advantageously enables the fabrication of highly sintered electroceramics at a sintering temperature of ~200° C. lower than those normally required by traditional precursor-calcination-milling-pelleting-sintering routes. The lowered processing temperatures for electroceramics do not involve the use of any sintering aids/additives and therefore the electrical properties of the electroceramics are not adversely affected thereby.

The starting materials used in the direct processing technique are preferably commercially available inorganic chemicals, such as lead nitrate, zirconium oxynitrate, titanium tetrachloride, strontium nitrate and barium nitrate, in either solid or solution forms. From these inorganic chemicals an aqueous solution containing required cations such as $Pb^{2+}$, $Zr^{4+}$, $Ti^{4+}$ $Ba^{2+}$ and $Sr^{2+}$, at a designed molar ratio is prepared.

Sintering of the re-compacted preform is carried out at a temperature, generally determined as a function of the electroceramic material being produced. Preferably, the sintering temperature is in the range of from 90° C. to 1400° C.

As already discussed, the electroceramic material may include, for example PZT or BST. In a preferred embodiment, the electroceramic material comprises PZT having the formula $Pb(ZrTi)O_3$ with a Zr:Ti molar ratio ranging from 80:20 to 20:80, more preferably 65:35 to 35:65.

According to one embodiment the coprecipitation of $Pb(ZrTi)O_3$ hydroxides is carried out by slowly adding an aqueous solution containing $Pb^{2+}$, $Zr^{4+}$, $Ti^{4+}$ cations to an ammonia solution of ~pH9. The resulting coprecipitates are then preferably aged for 1.0 hour in the supernatant liquid before being recovered by filtration and dried at a temperature ranging from 70° C. to 120° C. for 2 hours in an oven. To fabricate sintered PZT ceramics, the as-dried precursor powders are preferably compacted uniaxially in a hardened steel die at a pressure in the range of 20 to 100 MPa. Thermal treatment of the precursor pellets is preferably then carried out for 4 hours at a temperature in the range from 400° C. to 700° C., using a heating rate of 2° C./minute. The thermally treated powder compacts are further isostatically pressed, preferably at a pressure in the range of 200 to 500

MPa. Sintering of the isostatically pressed powder pellets is made in air at a temperature in the range of 950° C. to 1200° C. for a duration of 1 to 4 hours, with both heating and cooling rates being fixed at 5° C./minute. The hydroxide-derived lead zirconate titanate, $Pb(Zr_{0.52}Ti_{0.48})O_3$, is sintered to a relative density of >98% theoretical at 980° C. for 4 hours without the use of any sintering aids/additives.

According to another embodiment the direct processing technique has also been used to fabricate sintered $Ba_{1-x}Sr_xTiO_3$. For this, an aqueous solution containing $Ba^{2+}$, $Sr^{2+}$ and $Ti^{4+}$ cations at a designed molar ratio is prepared. An appropriate amount of aqueous solution containing 30 wt % $C_2H_2O_4$ is then slowly titrated into the aqueous solution containing $Ba^{2+}$, $Sr^{2+}$ and $Ti^{4+}$ at a rate of 5 ml/minute, resulting in the coprecipitation of Ba-Sr-Ti-oxalates. To remove the $Cl^-$, the oxalate gels are filtered and washed repeatedly using de-ionized water. They are then aged for 2 hours in the supernatant liquid before being recovered by filtration and subsequently dried at 70° C. to 120° C. for 10 hours in an oven. To fabricate sintered BST, the as-dried precursor powder was compacted uniaxially in a hardened die at a pressure in the range of 20 to 100 MPa. The pellets were then heated at a rate of 1° C./minute to a temperature in the range of 500° C. to 700° C., where they are kept for 10 hours, followed by an isostatic pressing at a pressure in the range of 200 to 500 MPa. Sintering of the isostatically pressed pellets is then carried out at various temperatures in the range of 1000° C. to 1400° C., more preferably 1100° C. to 1250° C., while both the heating and cooling rates were fixed at 5° C./minute. In this embodiment, oxalate-derived barium strontium titanate $(Ba_{0.65}Sr_{0.35}TiO_3)$ may be sintered to a density of >99% theoretical at 1200° C. for 1 hour.

Preferred embodiments of the present invention will be further demonstrated by the following examples. These examples illustrate the fabrication of PZT ceramics of different Zr:Ti ratios and BST ceramics, without the use of any sintering aids/additives. These examples are not intended to limit the scope of this invention.

EXAMPLE 1

DIRECT PROCESSING OF $Pb(Zr_{0.52}Ti_{0.48})O_3$ FROM HYDROXIDE PRECURSORS

The starting materials were commercially available $Pb(NO_3)_2$, $TiCl_4$ and $ZrO(NO_3)_2$ (e.g. in the form of an aqueous solution containing 20 wt % $ZrO_2$) of high purity. To prepare an aqueous solution containing $Pb^{2+}$, $Zr^{4+}$ and $Ti^{4+}$ cations in the molar ratio of 1:0.52:0.48, an appropriate amount of chilled (~4° C.) de-ionized water was slowly added into a cool $TiCl_4$ solution while being stirred ($TiCl_4$:water ratio: 1:14.25). A pre-weighted $ZrO(NO_3)_2$ solution (as required for the Zr:Ti ratio in PZT) was then blended into the $TiCl_4$-water mixture, before a desirable amount of cold ammonia solution (12 wt %) was added into the mixed solution to obtain a pH level of ~10 for the mixed solution. The addition of ammonia solution resulted in the coprecipitation of Zr-Ti-hydroxides. To remove the $Cl^-$ ions, the gelatinous Zr-Ti-coprecipitate was filtered and washed repeatedly using de-ionized water until the pH of filtrate was close to 7.0 and no trace of $Cl^-$ could be detected using $AgNO_3$. An aqueous oxynitrate solution containing $Zr^{4+}$ and $Ti^{4+}$ cations equivalent to 7 wt % ZT was subsequently prepared by dissolving the white coprecipitate into an appropriate amount of 3.0M $HNO_3$. The desirable amount of $Pb(NO_3)_2$ as required for the Pb:Zr:Ti ratio in PZT was first dissolved in de-ionized water and was then combined into the Zr-Ti-oxynitrate solution, for the formation of designed nitrate solution containing $Pb^{2+}$, $Zr^{4+}$ and $Ti^{4+}$ cations in the molar ratio of 1:0.52:0.48 (PZT concentration: 12 wt %).

The coprecipitation of $Pb(ZrTi)O_3$ hydroxides was carried out by slowly adding the mixed nitrate solution into an ammonia solution of pH9, which was checked and maintained by an appropriate amount of concentrated ammonia solution during the coprecipitation process. The coprecipitates were then aged for 1 hour in supernatant liquid before being recovered by filtration and dried at 90° C. for 2 hours in an oven. To fabricate sintered PZT ceramics, the as-dried precursor powders were compacted uniaxially in a hardened steel die of 12.5 mm in diameter at a pressure of 50 MPa. Thermal treatment of the precursor pellets was carried out for 4 hours at a temperature in the range from 400 to 700° C., using a heating rate of 2° C./minute. This resulted in a weight loss in the range of 20 to 25%, depending on the thermal treatment temperature. The total weight loss with respect to the starting materials was in the range of 40 to 45%. The thermally treated powder compacts were further isostatically pressed at a pressure in the range of 200 to 500 MPa, resulting in a green density in the range of 60 to 70% theoretical. A one-dimensional shrinkage in the range of 8 to 10% was observed for the powder pellets when they were subjected to an isostatic pressing at 350 MPa. The resulting green density was 5.60, 5.10, and 5.05 g/cm$^3$, equivalent to 70.0, 63.8 and 63.2% PZT theoretical density, for the pellets thermally treated at 400, 500 and 600° C., respectively, as measured on the basis of pellet mass and dimensions. Sintering of the isostatically pressed powder compacts was made in air at a temperature in the range of 950 to 1 200° C. for a duration of 1 to 4 hours, with both heating and cooling rates being fixed at 5° C./minute.

The $Pb(Zr_{0.52}Ti_{0.48})O_3$ pellets thermally treated at 500° C. for 4 hours and then isostatically pressed at 350 MPa exhibited a sintered density of 7.37, 7.70, 7.93, 7.81 and 7.74 g/cm$^3$ as measured using immersion technique in de-ionized water, when sintered for 1 hour at 950, 1000, 1050, 1100 and 1150° C., respectively. Their dimensional shrinkages were in the range of 25 to 30%, depending on the sintering temperature. This suggests that the sintered density increases with rising temperature over the range from 950 to 1050° C., where it maximizes. Further increasing the sintering temperature above 1050° C. results in a slight fall in sintered density, presumably due to the loss of lead oxide together with the occurrence of exaggerated grain growth at too high a temperature. It is believed that the evaporation of lead oxide at the sintering temperature will be significantly reduced by embedding the PZT pellets in an appropriate PZT powder. The sintering temperature (1050° C.), at which a maximum sintered density of 99.2% theoretical density is achieved, is considerably lower than those (in the range of ~1300° C.) generally required by powders prepared via the conventional solid state reaction and many chemistry-based processing routes. At the same time, the sintered density of PZT via the direct processing technique is among the highest ever achieved by pressureless sintering. An average grain size of ~10 m was measured, using the line interception technique, for the PZT with a sintered density of 99.2% theoretical density. It was yellow in appearance and exhibited a room temperature dielectric constant of 1024 and a dielectric loss of 2.1% when measured using a HP 4284A LCR meter at a frequency of 1.0 kHz. FIG. 2 is a XRD trace for $Pb(Zr_{0.52}Ti_{0.48})O_3$ sintered at 1050° C. for 1 hour, indicating that it is of high purity.

The $Pb(Zr_{0.52}Ti_{0.48})O_3$ composition treated at 600° C. for 4 hours exhibited a sintered density of 7.22, 7.56, 7.78, 7.63 and 7.54 g/cm$^3$ when sintered for 1 hour at 950, 1 5 1000, 1050, 1100 and 1150° C., respectively. They were lower than those of Pb(Zr$_{0.52}$Ti$_{0.48}$)O$_3$ pellets treated at 500° C. at each of the sintering temperatures. For those thermally treated at 400° C. and 700° C., the resultant sintered densities are poorer.

To further investigate the effect of sintering time at temperatures below 1000° C., the pellets thermally treated at 500° C. were sintered for 4 hours at various temperatures ranging from 900 to 990° C. The Pb(Zr$_{0.52}$Ti$_{0.48}$)O$_3$ sintered at 950° C. exhibited a sintered density of 7.76 g/cm$^3$ and had a room temperature dielectric constant of 956 and a dielectric loss of 2.6% at a frequency of 1.0 kHz. The specimen sintered at 980° C. for 4 hours exhibited a sintered density of 98.1% theoretical density and registered a room temperature dielectric constant of 975 and a dielectric loss of 2.4%. These values are comparable to those reported for conventional PZT sintered at temperatures in the range of 1200 to 1300° C., demonstrating the effectiveness of the direct processing technique in lowering the sintering temperature of PZT derived from hydroxide precursors, without the use of any sintering aids/additives.

In summary of the above example, inexpensive inorganic chemicals, such as Pb(NO$_3$)$_2$, TiCl$_4$ and ZrO(NO$_3$)$_2$, are used as the starting materials for the fabrication of highly densified Pb(Zr$_{0.52}$Ti$_{0.48}$)O$_3$ at a temperature much lower than that normally required in the traditional precursor-calcination-milling-pelleting-sintering route. The novel direct processing route does not involve the intermediate calcination and milling steps of precursor powders and the use of sintering additives.

EXAMPLE 2

DIRECT PROCESSING OF Pb(Zr$_{0.65}$Ti$_{0.35}$)O$_3$ FROM HYDROXIDE PRECURSORS

A coprecipitated PZT hydroxide composition with the Pb:Zr:Ti molar ratio of 1.0:0.65:0.35 was prepared from Pb(NO$_3$)$_2$, TiCl$_4$ and ZrO(NO$_3$)$_2$ (an aqueous solution containing 20 wt % ZrO$_2$) by following the procedure detailed above. The powder pellet of hydroxide precursor was thermally treated at 500° C. for 4 hours and then isostatically pressed at 350 MPa. The thermal treatment resulted in a weight loss of 24.2%. The pellet was subsequently sintered at 1050° C. for 4 hours, resulting in a sintering shrinkage of 26.7% and a sintered density of 7.74 g/cm$^3$. The sintered Pb(Zr$_{0.65}$Ti$_{0.35}$)O$_3$ appeared light yellow and exhibited a room temperature dielectric constant of 603 and a room temperature dielectric loss 3.6%. The composition was also sintered for 1 hour at 1050, 1100, 1150 and 1200° C., respectively, resulting in a respective sintered density of 7.38, 7.48, 7.78 and 7.82 g/cm$^3$. The sintered PZT exhibited a dielectric constant of 463, 502, 607 and 643 and a dielectric loss of 6.1, 5.0, 3.4 and 2.5%, respectively, for these sintering temperatures.

EXAMPLE 3

DIRECT PROCESSING OF Pb(Zr$_{0.35}$Ti$_{0.65}$)O$_3$ FROM HYDROXIDE PRECURSORS

A coprecipitated PZT composition with the Pb:Zr:Ti ratio of 1.0:0.35:0.65 was prepared from Pb(NO$_3$)$_2$, TiCl$_4$ and ZrO(NO$_3$)$_2$ (an aqueous solution containing 20 wt % ZrO$_2$) by following the procedure detailed above. The thermal treatment and isostatic pressing schedules were the same as in example 2 for the composition of Pb(Zr$_{0.65}$Ti$_{0.35}$)O$_3$. A weight loss of 22.7% was observed when the pellet was thermally treated at 500° C. for 4 hours. The sintered Pb(Zr$_{0.35}$Ti$_{0.65}$)O$_3$ was heavy yellow in appearance and showed a sintered density of 7.48 g/cm$^3$ when sintered at 950° C. for 4 hours. Its room temperature dielectric constant and room temperature dielectric loss were 517 and 2.7%, respectively, at a frequency of 1.0 kHz. The PZT composition was also sintered for 1 hour at 950, 1000,1050 and 1100° C., respectively, leading to a respective sintered density of 7.71, 7.77, 7.90 and 7.82 g/cm$^3$. Their room temperature dielectric constant and room temperature dielectric loss were 480, 491, 532 and 514, and 3.9, 3.4, 2.2 and 2.9%, respectively, for these sintering temperatures.

EXAMPLE 4

DIRECT PROCESSING OF Ba$_{0.65}$Sr$_{0.35}$TiO$_3$ FROM OXALATE PRECURSORS

The starting materials for BST were commercially available barium nitrate, Ba(NO$_3$)$_2$, strontium nitrate, Sr(NO$_3$)$_2$, titanium tetrachloride, TiCl$_4$ and oxalate acid, C$_2$H$_2$O$_4$2H$_2$O of high purity. To prepare an aqueous solution containing Ba$^{2+}$, Sr$^{2+}$ and Ti$^{4+}$ cations of the molar ratio of 0.65:0.35:1.0 (BST concentration: 10 wt %), an appropriate amount of chilled (~4° C.) de-ionized water was slowly added into a cool TiCl$_4$ solution while being stirred (TiCl$_4$:water ratio: 1:15). The desirable amounts of Ba(NO$_3$)$_2$, and Sr(NO$_3$)$_2$ as required for the Ba:Sr:Ti ratio in BST were first dissolved in de-ionized water and then combined into the TiCl$_4$-water solution. A pre-weighted amount of C$_2$H$_2$O$_4$2H$_2$O, as worked out on the basis of the C$_2$H$_2$O$_4$2H$_2$O:BST molar ratio: 3.5:1.0 was dissolved in de-ionized water to prepare an aqueous solution containing 30 wt % C$_2$H$_2$O$_4$. The oxalic acid solution was then slowly titrated into the aqueous solution containing Ba$^{2+}$, Sr$^{2+}$ and Ti$^{4+}$ at a rate of 5 ml/minute, resulting in the co-precipitation of Ba-Sr-Ti-oxalates. To remove the Cl$^-$, the oxalate gels were filtered and washed repeatedly using de-ionized water until no trace of Cl$^-$ could be detected using AgNO$_3$. They were then aged for 2 hours in the supernatant liquid before being recovered by filtration and subsequently dried at 100° C. for 10 hours in an oven. To fabricate sintered BST, the as-dried precursor powder was compacted uniaxially in a hardened die of 12.5 mm in diameter at a pressure of 30 MPa. The pellets were then heated at a rate of 1° C./minute to 600° C., where they were kept for 10 hours, followed by an isostatic pressing at a pressure of 350 MPa. A weight loss of 50.8% was noted when the pellet was subjected to the thermal treatment. Sintering was then carried out at various temperatures in the range of 1100 to 1250° C. for 1 hour, while both the heating and cooling rates were fixed at 5° C./minute. The sintering shrinkages were in the range of 40 to 45%, depending on the sintering temperature. A sintered density of 5.15, 5.50, 5.70 and 5.61 g/cm$^3$ was measured for the pellets sintered for 1 hour at 1100, 1150, 1200 and 1250° C., respectively, as determined using immersion technique in de-ionized water. The sintered BST ceramic at 1200° C. for 1 hour, which was grey in appearance and exhibited a relative density of 99.4% theoretical density, demonstrated a dielectric constant of 9000, a dielectric loss of 0.23% and a curie temperature of ~20° C. at a frequency of 1 MHz. As shown by the XRD trace in FIG. 3, the directly processed Ba$_{0.65}$Sr$_{0.35}$TiO$_3$ is of considerably high purity.

What is claimed is:

1. A method for producing an electroceramic material selected from the group consisting of lead zirconate titanate (PZT) and barium strontium titanate (BST), said method comprising:

(a) compacting a precursor of said electroceramic material to form a preform, said precursor selected from the group consisting of hydroxides and oxalates of said electroceramic material;

(b) thermally treating the preform at a predetermined temperature;

(c) re-compacting the preform; and (d) sintering the re-compacted preform to form said electroceramic material.

2. A method according to claim 1, wherein the preform is thermally treated at a temperature in the range of 400° C. to 600° C.

3. A method according to claim 1, wherein the re-compaction of the preform is carried out in a cold isostatic press.

4. A method according to claim 1, wherein sintering of the recompacted preform is carried out at a temperature in the range of 900° C. to 1400° C.

5. A method according to claim 1, wherein $Pb(Zr_{0.52}Ti_{0.48})O_3$ is produced from hydroxide precursors, and wherein the sintering of the re-compacted preform is carried out at a temperature in the range of 900° C. to 1100° C.

6. A method according to claim 1, wherein barium strontium titanate is produced from a precursor of oxalates, and wherein the sintering of the re-compacted preform is carried out at a temperature in the range of 1000° C. to 1400° C.

7. A method according to claim 6, wherein $Ba_{0.65}Sr_{0.35}TiO_3$ is produced from oxalate precursors, and wherein sintering is carried out at about 1200° C., the relative density of the $Ba_{0.65}Sr_{0.35}TiO_3$ being about 99.4% of theoretical density.

8. A method according to claim 1, wherein said lead zirconate titanate has the formula $Pb(ZrTi)O_3$ with Zr:Ti molar ratio ranging from 80:20 to 20:80.

9. A method according to claim 1, additionally comprising forming said hydroxide and/or oxalate precursors by coprecipitation of an aqueous solution of preselected cations.

* * * * *

UNITED STATES PATENT AND TRADEMARK OFFICE
CERTIFICATE OF CORRECTION

PATENT NO. : 6,592,805 B1
DATED : July 15, 2003
INVENTOR(S) : John Wang et al.

It is certified that error appears in the above-identified patent and that said Letters Patent is hereby corrected as shown below:

Column 2,
Line 26, reading "grain junction" should read -- grain junctions --.

Column 4,
Line 25, reading "is iprovided" should read -- is provided --.
Line 57, reading "supematant" should read -- supernatant --.

Column 5,
Line 18, reading "supematant" should read -- supernatant --.

Column 6,
Line 58, reading "~10 m" should read -- ~10 mm --.

Column 7,
Line 1, reading "950, 1 5 1000" should read -- 950, 1000 --.

Column 8,
Line 60, reading "curie temperature" should read -- Curie temperature --.

Signed and Sealed this

Eighteenth Day of November, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,592,805 B1
DATED         : July 15, 2003
INVENTOR(S)   : John Wang et al.

It is certified that error appears in the above-identified patent and that said Letters Patent is hereby corrected as shown below:

Column 6,
Line 58, reading "~10 m" should read -- ~10 $\mu$m --.

Signed and Sealed this

Fourth Day of May, 2004

JON W. DUDAS
*Acting Director of the United States Patent and Trademark Office*